(12) United States Patent
Corbin et al.

(10) Patent No.: US 7,441,456 B1
(45) Date of Patent: Oct. 28, 2008

(54) DRIVE SHAFT BALANCER AND METHOD UTILIZING WEIGHT TRANSPORTING ELECTRODES

(76) Inventors: Robert R. Corbin, 27994 Trailwood Ct., Farmington Hills, MI (US) 48331;
Andrew J. Abraham, 1675 Wethersfield Ct., Rochester Hills, MI (US) 48309;
Brad L. Jeffrey, 3930 Poli, Ortonville, MI (US) 48462

( * ) Notice: Subject to any disclaimer, the term of this patent is extended or adjusted under 35 U.S.C. 154(b) by 393 days.

(21) Appl. No.: 11/273,312

(22) Filed: Nov. 14, 2005

Related U.S. Application Data

(60) Provisional application No. 60/627,795, filed on Nov. 15, 2004.

(51) Int. Cl.
*G01M 1/16* (2006.01)
(52) U.S. Cl. .......................................... 73/462; 73/468
(58) Field of Classification Search ................... 73/460, 73/462, 468, 469, 66
See application file for complete search history.

(56) References Cited

U.S. PATENT DOCUMENTS

| | | | | | |
|---|---|---|---|---|---|
| 4,653,324 | A | * | 3/1987 | Nugier | 73/460 |
| 5,046,361 | A | * | 9/1991 | Sandstrom | 73/460 |
| 6,694,812 | B2 | * | 2/2004 | Loetzner et al. | 73/462 |
| 6,840,105 | B2 | * | 1/2005 | Calkins et al. | 73/469 |
| 7,066,025 | B1 | * | 6/2006 | Corbin | 73/462 |
| 7,249,508 | B2 | * | 7/2007 | Rogalla et al. | 73/468 |

* cited by examiner

*Primary Examiner*—Helen C. Kwok
(74) *Attorney, Agent, or Firm*—Young Basile

(57) ABSTRACT

The invention is a machine for balancing drive shafts under computer control. Compensatory weights are formed in a weight-forming dye assembly which is coaxially repositionable in relation to the longitudinal axis of the drive shaft. Additionally, the weights formed are transported along an axis parallel to the longitudinal axis of the drive shaft, and are secured to the drive shaft utilizing a welding head which is selectively positionable along one side of the length of the drive shaft. Sensors are provided to determine the out-of-balance of the shaft, and an associated computer performs the necessary calculations for determining the appropriate position and mass of the compensatory weight.

7 Claims, 6 Drawing Sheets

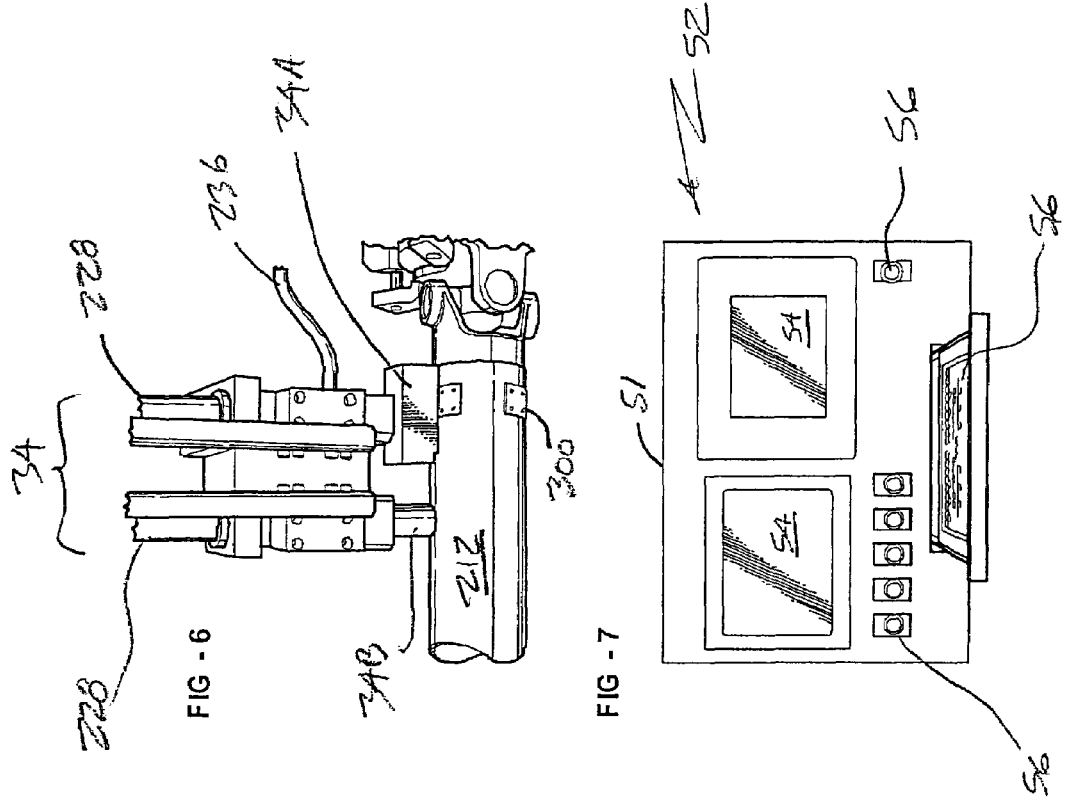

DRIVE SHAFT BALANCER AND METHOD UTILIZING WEIGHT TRANSPORTING ELECTRODES

PRIORITY CLAIM

This application claims the benefit of U.S. Provisional Application No. 60/627,795, filed Nov. 15, 2004.

FIELD OF THE INVENTION

The present invention relates to balancing drive shafts, and more particularly, an apparatus and method for balancing a drive shaft under computer control by welding customized weights to an outer surface of the drive shaft.

BACKGROUND OF THE INVENTION

Motor vehicle drive trains generally include a substantially tubular drive shaft and one or more axles driven through a differential mechanism. Collectively, this drive train is driven by a prime mover, such as an engine, through a transmission. Drive shafts, sometimes referred to as propeller shafts, are remarkably simple mechanically but are a vital element of the drive train. It has long been recognized that balancing of the drive shaft is a key element in improving the overall performance of the drive train. A well-balanced drive shaft results in a motor vehicle which is smoother and quieter. In addition, reducing or removing excessive vibration in the drive shaft contributes to increased component life of the remaining components in both the drive shaft and motor vehicle.

A wide variety of methodologies have been developed for the automated testing and balancing of tubular drive shaft elements. Modern computers, by virtue of their low cost and versatility, have become commonplace components in the process of drive shaft balancing. Utilizing testing equipment which is capable of determining the precise angular position of a drive shaft in relation to a test fixture, it is possible to analyze the vibrational signature of a drive shaft with exquisite precision. The information generated by such computers can then be fed back to an operator or automated machine to assist in the precise location of counterweights in relation to the drive shaft, thereby minimizing its tendency to vibrate over a wide range of speeds and operating conditions.

The existing methodologies all generally involve placement of a drive shaft or similar rotating element in a fixture similar to an ordinary lathe. The drive shaft is suspended from spindles on opposing ends of the machine, and rotated rapidly on the spindles utilizing well-known power means. Sensors associated with the spindles determine an out-of-balance condition and provide a computer display or printout of the angular position on the shaft corresponding to an imbalance. Modern computers in this application are also programmed to identify the amount of the counterweight required in order to bring the shaft into balance. In other words, both the position of the imbalance and the mass and location of the necessary counterweight are provided by the associated computer.

In the current state of the art, individual weights of varying sizes and masses are attached to the shaft by projection welding. Such weights have small "feet" or projections which facilitate the attachment of the weight to the outer surface of the shaft. The weights themselves are generally small rectangular elements having a curvature which matches or approximates the curvature of the outer circumference of the shaft. In the current state of the art an operator either manually positions, or instructs a robotic element to position the necessary weight on the propeller or drive shaft in an appropriate position in relation to the out-of-balance position. The required weights are then secured to the propeller shaft by an automated welding device. This process may require the positioning of one or more weights of varying sizes in different angular positions on the circumference of the shaft. Once the welding operations are completed, the shaft may again be tested to verify that the weight positioning is correct.

In the current state of the art, the task is work-intensive, requiring the operator to frequently stop and start the balancer, determine the proper location for the weights, locate suitable size and mass of weights, manually position the weights on the shaft, operate the welding apparatus for securing the weights to the shaft and then verify the positioning. Numerous efforts have been made over the years to automate this process. Recently, one of the inventors of the present invention has filed a patent application for an improved apparatus for shaft-balancing using an automated process and a collection of standardized weights as described in the co-pending application Ser. No. 10/739,365.

Additional improvements to the machines for performing the balancing and welding tasks have been developed recently, including machines which will automatically feed and place custom-formed weights and weld them to the shaft being balanced. Problems exist, however, in that the welding heads associated with this type of equipment are fixed in relation to the position of the drive shaft, limiting the longitudinal position of the shaft on which the weight can be placed, and further limiting the relationship of the position of weights which can be disposed about the circumference of and along the longitudinal axis of the shaft to be balanced. Further, existing welding equipment is bulky and surrounds the shaft to position positive and negative electrodes on opposite sides of the shaft. This restricts the ability to position the welding head along the length of the shaft.

It has been learned that substantially improved drive shaft balancing can be achieved by the utilization of side-by-side welding electrodes which can be selectively positioned in relation to the longitudinal axis of the drive shaft, as the welding device is positioned under computer control.

What is needed then, is a welding apparatus wherein the stations for forming and welding the weights can be easily and continuously positioned along the same longitudinal axis utilized by the balancing machine for the drive shafts being balanced.

SUMMARY OF THE INVENTION

The present invention comprises an automated drive shaft balancing apparatus which includes at least one storage and feed station for storing and feeding one or more ribbons of metal to be utilized as weights for affixation to a drive shaft. Adjacent to each storage and feed station is a ribbon conditioning station for straightening the coiled ribbon of metal, followed by a weight-forming station, which includes the necessary equipment for imparting a curvature to the metal ribbon, severing the metal ribbon into successive individual metal weight pieces, imparting dimples into the metal piece so formed to facilitate the projection welding process, and placing the metal piece so curved, dimpled and formed in a position convenient for delivering the weight to a welding and balancing station. The welding and balancing station is adjacent to means for removing the weight from the weight-forming station and transferring the weight to the outer circumference of a drive shaft to be balanced at a longitudinal position determined to effectuate a precision balancing of the drive shaft under dynamic conditions. The welding apparatus is a dual electrode device which is continuously positionable along the length of the drive shaft. Once the proper position for the weight has been determined by dynamic sensing of an out-of-balance condition of the drive shaft, the drive shaft is stopped and the weld electrodes, under computer control, are positioned along the longitudinal axis of the drive shaft, and the drive shaft is rotated to the correct rotational position in relation to the weld electrodes, the weight is positioned on the outer circumference of the drive shaft and the weld electrodes operate to permanently secure the metal weight to the outer surface of the drive shaft.

Associated with the invention is a pair of spindles provided with chucks to which the drive shaft can be mounted, and a drive system for spinning the drive shaft at a predetermined speed. Also associated with the invention is a series of sensors which determine the angular position of the drive shaft in relation to an out-of-balance condition thereby determining the point on the outer circumference of the drive shaft to which weights may be added to bring the drive shaft into balance, and to further to determine the appropriate amount of weight to be applied at that location.

Also associated with the invention are a computer and associated software which are interfaced with the necessary external sensors to sense the drive shaft out-of-balance condition and to store and manipulate that information, as well as the necessary controls to operate all of the aspects of the drive shaft balancing equipment so that it may operate in a fully automated fashion. In one embodiment of our invention, the apparatus comprises two complete feed stations, conditioning stations, weight-forming stations, weight-positioning and welding stations positioned on opposite ends of a drive shaft, to permit both ends of the drive shaft to be dynamically balanced simultaneously. Our invention further comprises means for rapidly repositioning both the weight-forming station and the welding electrodes without the need for complicated disassembly and reassembly of the various components. In this fashion, our invention is easily adapted to an infinite variety of lengths of drive shafts in a matter of minutes, rather than the several hours usually required to reconfigure existing equipment when it is desired to change the size of the shaft being evaluated.

The present invention allows positioning of the welding head at any longitudinal station along the length of the drive shaft being balanced. In the current state-of-the-art, the drive shaft weight position on the exterior of the drive shaft is fixed in relation to the drive shaft. For example, if drive shaft is positioned in a conventional balancing apparatus, the setup of the equipment dictates that the welding electrodes will be positioned a fixed distance from one end of the drive shaft. All weights attached to the drive shaft, therefore, will be positioned the same fixed distance from the end of the shaft. While it is possible to reposition the welding head to affect positioning of the weights a different distance from the end of the shaft, that reconfiguration necessitates dismounting the welding electrodes and their associated mounting hardware from the frame of the balancing machine, and remounting the welding apparatus at a different location. This process usually involves the removal and reinsertion of numerous fasteners, such as nuts and bolts, and further requires recalibration of the equipment in view of the effect of changing the position of the weights in relation to the longitudinal dimensions of the drive shaft. Also, since effective positioning of weights on a drive shaft is, to a small extent, a trial and error operation, the repositioning of the welding electrodes utilizing the primitive methods above-described sometimes results in unsatisfactory balancing results, necessitating a still further repositioning of the welding electrodes.

The present invention includes weight-forming and transport means which allow the weight to be moved from a position along the longitudinal axis of the shaft, as opposed to a position perpendicular to the longitudinal axis of the shaft.

DESCRIPTION OF THE DRAWINGS

FIG. 6 is a simplified perspective view of the welding electrodes, weight and drive shaft.

FIG. 7 is a simplified front view of the control console and display.

FIG. 8 is a perspective view of the weight element.

DESCRIPTION OF THE EMBODIMENT

Figure 1:
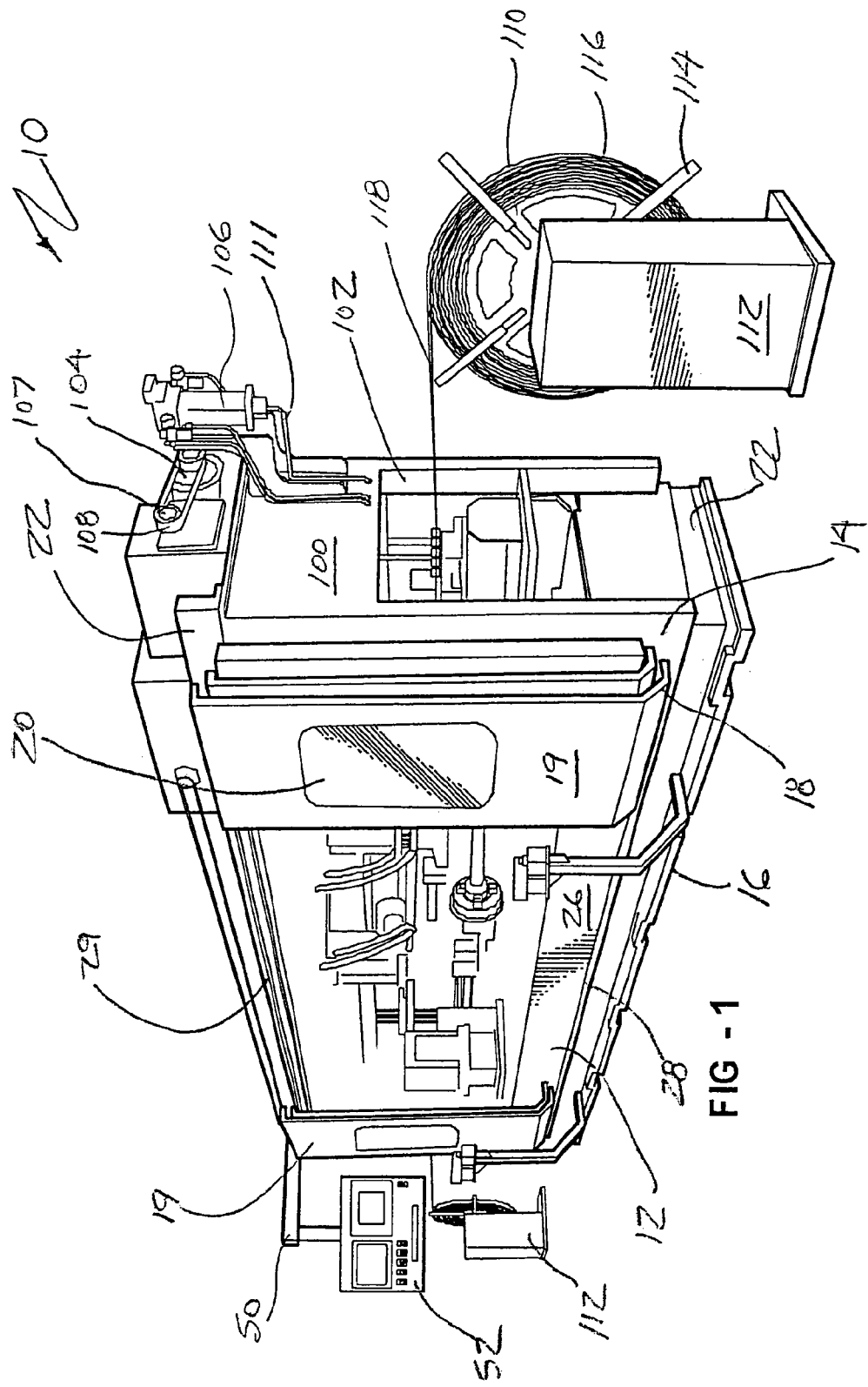
FIG. 1 is a perspective view of the invention showing the respective positions of the storage and feed stations, the ribbon conditioning stations, the weight forming stations and the welding and balancing station, as well as the general configuration of the framework, enclosure and doors.

The present invention is a balancing machine 10 which comprises a collection of interrelated subassemblies which, together accomplish the necessary tasks for forming, positioning and securing one or more balance weights 300 to a drive shaft 212.

The main components of the balancing machine 10 are mounted to a framework 12 which is surrounded by an enclosure 14 which serves to contain all of the mechanical and welding functions of the balancing machine 10 during the process, thereby protecting persons in the vicinity of the operation from possible injury during the machine operation. To achieve this result, the balancing machine framework 12 and associated enclosure 14 is provided with at least one door assembly 18 which can be selectively opened and closed under machine control to insure that the enclosure 14 is closed during the balancing and welding operations. The framework 12 is provided with a base 16 for mounting on the factory floor, and the entire assembly is designed as a self-contained repositionable station, whereby the entire balancing machine may be preassembled and delivered to the factory floor in operational condition to simplify the setup and minimize the amount of time required for integrating the balancing operation into the factory work flow.

In one embodiment of the invention, the balancing machine 10 has two complete sets of operational components disposed at opposite ends of the balancing machine framework 12, so that both ends of a drive shaft 212 may be provided with balancing weights 300. Regardless, however, of whether a single-ended or double-ended balancing machine 10 is provided, the basic subassemblies associated with the affixation of weights 300 to each end of the drive shaft 212 is the same.

Figure 2:
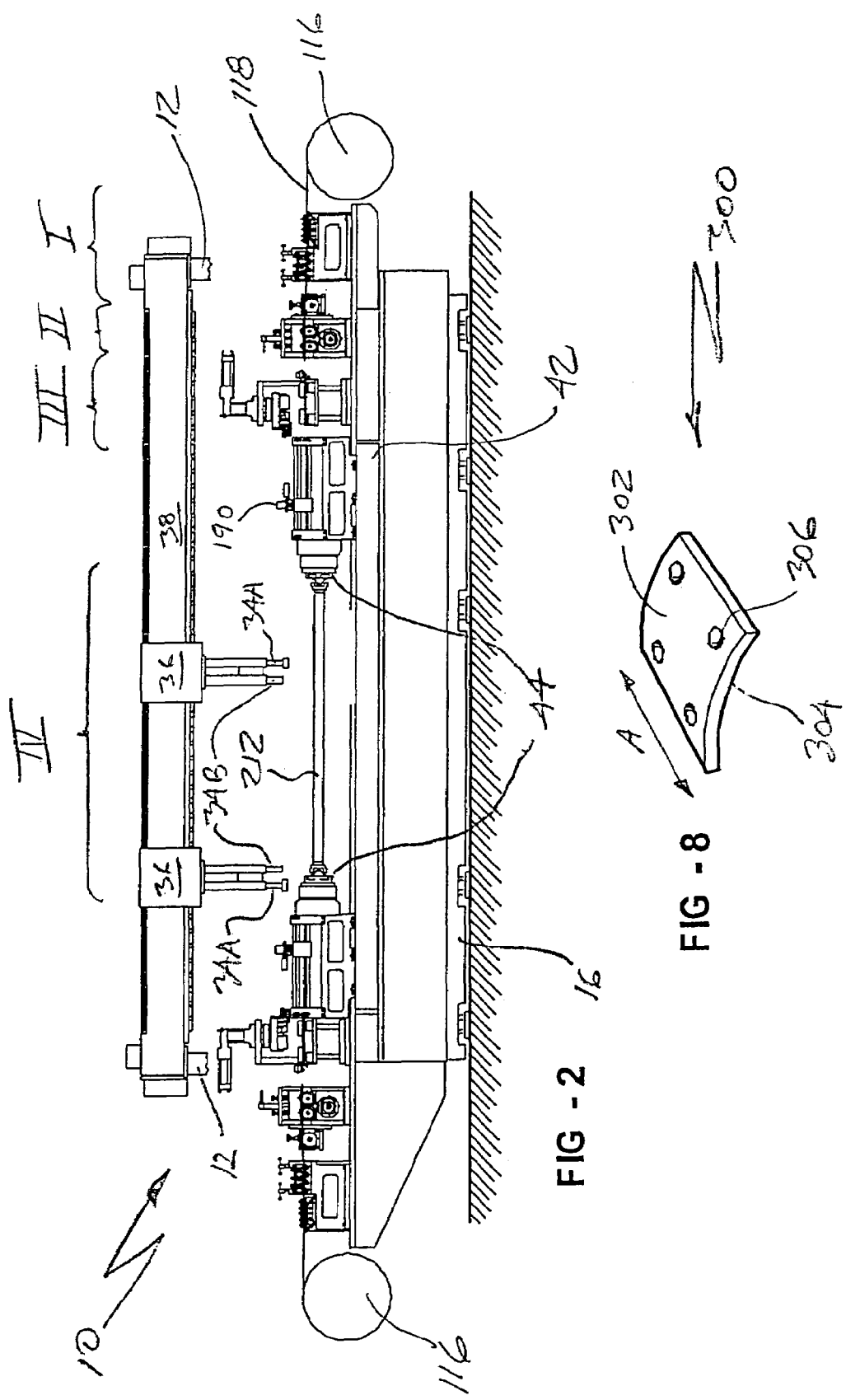
FIG. 2 is a simplified front view of the operative elements of the invention.

As shown in FIG. 2, associated with the balancing machine 10 is at least one storage and feed station I including uncoiling apparatus which serves to hold and uncoil a coil 116 of metal, for example, steel, which is dispensed from the coil 116 in a ribbon-like fashion to a conditioning station II which removes the curvature imparted to the coiled metal during the original manufacturing and coiling process for that metal. Since the coiled metal tends to take a "set" after being placed on and stored in a coil-like configuration, the conditioning station II serves to reverse that set and presents a flat ribbon 118 of steel to the next station.

The conditioning station II includes a drive mechanism for moving the ribbon 118 of metal from the into the weight-forming station III. At the weight-forming station III, the ribbon 118 of metal is advanced into a die mechanism where an arcuate curvature is imparted to the metal ribbon 118, the metal ribbon 118 is cut into a short weight 300 of the correct size and weight for accomplishing the balancing task, and where the formed weight 300 is dimpled to provide welding projections which will be used in the welding process. Further, at the end of the weigh-forming station III, the formed weight 300 is delivered to a weight delivery shuttle 190, which facilitates transfer of the formed weight 300 to the welding and balancing station IV. The weight delivery shuttle 190 moves the weight 300 along an axis generally parallel to the longitudinal axis of the shaft 212, allowing for a substantially more compact configuration of the balancing machine 10.

The weld electrodes 34A and 34B perform the functions of receiving and positioning the weight 300 formed, and transferring the weight 300 to the correct position on the drive shaft 212, and thereafter performing the weld operation. The weld electrodes 34A and 34B constitute a dual head side-by-side welding device, as compared to "C" style weld heads having opposing electrodes disposed on opposite sides of the shaft 212. The use of a dual side-by-side welding head facilitates the unrestricted movement of the welding electrodes along the length of the shaft 212, and reduces the volume requirements of the entire machine. The side-by-side welding device is configured as a pair of adjacent electrodes mounted on pneumatic actuators 228, one carrying the positive electrode 34A and the other carrying the negative electrode 34B. The positive electrode 34A is also used to transport the weight 300 to its proper longitudinal placement on drive shaft 212. The weld current flows between the positive and negative electrodes 34A and 34B, longitudinally along the shaft 212. This side by side arrangement of electrodes is preferable to the "C" configuration found in many weld heads, wherein the weld current passes radially from the top to bottom or front to back of the shaft. By using a side by side pair of weld electrodes 34A, 34B, the weld system can easily be moved overhead along the length of the drive shaft 212 without interference from any impediments, such as guarding or tooling located beneath or around the rotating drive shaft 212. The use of the positive electrode 34A as a transfer device also simplifies part change-over and reduces down time. The side by side arrangement also allows for a constant distance between positive and negative electrodes, insuring consistency of current flow which is required for repetitive welding functions.

The balancing machine 10 is further provided with a computer controls which direct and monitor the balancing and welding process. The drive shaft 212 to be balanced is positioned in the balancing machine 10 by a pair of spindle mounted chucks 44 which are coupled to a drive system (not shown). The spindles are provided with angular position sensing devices as well as out-of-balance sensing devices (not shown). As the drive shaft 212 is spun at a high speed on the spindles, the sensing devices determine the angular position of the correction necessary at each end of the drive shaft 212, as well as compute an appropriate weight and longitudinal position on the drive shaft 212 to optimize the balance of the shaft 212. The computer further serves to start, stop and precisely position the outer circumference of the drive shaft 212 in relation to the weld electrodes 34A, 34B to insure that the balance weights 300 applied are positioned correctly in relation to the drive shaft 212.

With reference now to FIG. 1, a more thorough understanding of the stricture and operation of the invention may be obtained. Balancing machine 10 comprises generally a framework 12 supporting a partial enclosure 14, which includes various panels and doors which serve to substantially enclose the moving components as well as the high voltage components of the machine 10. Framework 12 further comprises a base 16 to which are affixed frame end supports 22 and frame side supports 26. End supports 24 and side supports 26, in turn, provide support for the frame upper support 22. Framework 12 further comprises upper and lower door tracks 28 and door rails 29 which, in turn, support a pair of door assemblies 18. Each door assembly 18 further comprises a plurality of door panels 19 which are nested in overlapping fashion. In the embodiment depicted in FIG. 1, there are a total of six door panels organized into two groups of three door panels 19 with the first door panel overlying the second door panel and the second door panel overlying the third door panel. When actuated to a closed position, the first door panel extends away from a retracted position toward an extended position, wherein it engages the second door panel, which is then pulled from a retracted position to an extended position wherein it engages the third door panel, which forms an array of door panels oriented in a side by side, yet still overlapping configuration. When the group of door panels is so extended, the front of the balancing machine 10 is completely enclosed, thereby protecting nearby personnel from the hazards associated with the moving machinery and welding operations taking place within the enclosure. Preferably, door panels 19 are provided with windows 20 which permit observation of the interior of the enclosure 14 when the door assemblies 18 are in the closed position.

The door panels 19 are supported by door rollers (not shown) which engage door tracks 28 and door rail engagement means (not shown) which secure the upper portion of each door panel to the enclosure in a slidable configuration. The combination of the engagement means, the door tracks 28, door rails 29 and door rollers 30 allow each door panel to be slidably moved in relation to the framework 12, under the control of door actuators. In one embodiment, door actuators operate under computer control to insure that the door panels 19 remain in the extended position during the balancing operation taking place within the balancing machine 10.

As shown in FIG. 2, located within the enclosure 14 is at least one pair of weld electrodes 34A, 34B secured to a weld head transport 36, which, in turn, is mounted to a weld head transport rail 38 which is supported by the framework 12. In the embodiment depicted herein, a dual welding station configuration is disclosed, wherein two weld electrode pairs 34 function simultaneously during the welding operation. However, it will be obvious to those skilled in the art that a single pair 34 of weld electrodes in a balancing machine may be implemented, as may be balancing machines 10 having three or more weld electrode pairs 34 associated with transports 36 and transport rails 38 to permit simultaneous affixation of multiple weights 300 at different longitudinal positions on a typical drive shaft 212.

Balancing machine 10 is also provided with one or more weight-forming stations III and a primary support rail 42 to which said weight-forming station III is movably attached.

Figure 5:
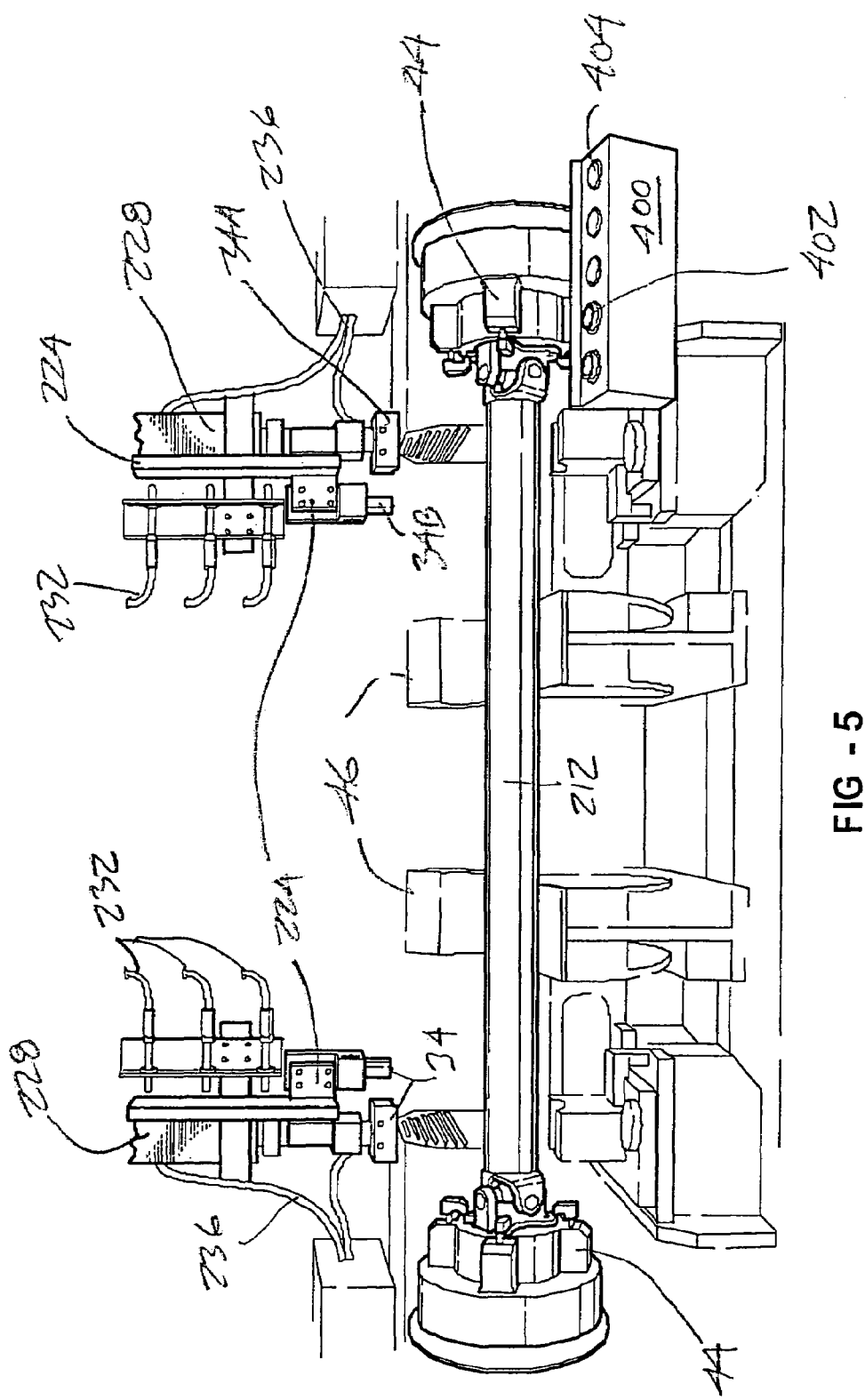
FIG. 5 is a simplified perspective view of the welding and balancing station.

Balancing machine 10 is also provided with a pair of chucks 44 as shown in FIG. 5, which form the primary holding tool for temporarily holding a drive shaft or propeller shaft 212 to be balanced. Also positioned within the enclosure 14 and located so as to surround the drive shaft 212 being balanced are a plurality of clam shell guards 46 which are adapted to surround the drive shaft 212 during the balancing process to provide an additional measure of safety in the event that the drive shaft 212 should unintentionally become disconnected from the chucks 44.

As shown in FIG. 1 and FIG. 7, the machine is further provided with one or more control consoles 52. A typical console will include a display means 54 and one or more user controls 56. Typically, the display and control assembly is affixed to a display control support frame 51 which is attached to the framework 12 by a support arm 50. In one embodiment, support arm 50 is pivotal to permit the display 54 and controls 56 to be positioned within a specified range of motion proximate one end of the balancing machine 10. One or more computers (not shown) may also be mounted to support frame 51. Such computers typically contain the programs and instructions for the automated operation of all aspects of machine 10.

Referring now to FIGS. 1 and 2, a typical implementation of the invention showing the feed of raw material for weight is depicted. The balancing machine 10 includes at least one frame side panel 100 having a frame side panel opening 102. Mounted to frame upper support 22 are one or more drive mechanisms 104 for positioning the weld electrode pairs 34 utilizing weld electrode transport 36 along weld electrode transport rail 38. In one embodiment, the weld head drive mechanism 104 is a computer-controlled servo mechanism provided with appropriate reduction spindles 107 and drive belt 108. Affixed to frame side panel 100 is a pneumatic supply inlet and manifold combination 106, which serves to receive and distribute pneumatic pressure throughout the balancing machine 10 utilizing pneumatic hoses 111.

Positioned proximate the frame side panel 100 is a coil reel carrier 112 to which is mounted a coil reel 110, which, in turn, is provided with coil reel guides 114. Coiled about coil reel 110 is a ribbon 118 of coiled metal 116 which forms the raw material from which a balance weight 300 as shown in FIG. 8 will be formed.

With attention now to FIG. 8, it will be seen that a weight 300 comprises a top surface 302, a bottom surface 304 and a plurality of feet 306 formed so as to project downwardly from bottom surface 304. Weight 300 has a variable length "A" and a curvature. The weight 300 is cut to length "A" based on commands from the computer which will be discussed in further detail herein.

In operation, metal ribbon 118 is uncoiled from coil reel 110 and fed into the balancing machine 10 through the frame side panel opening 102 of frame side panel 100, where it is presented to a ribbon conditioner station II which is secured to the balancing machine 10 by a ribbon conditioner support base 122.

Figure 3:
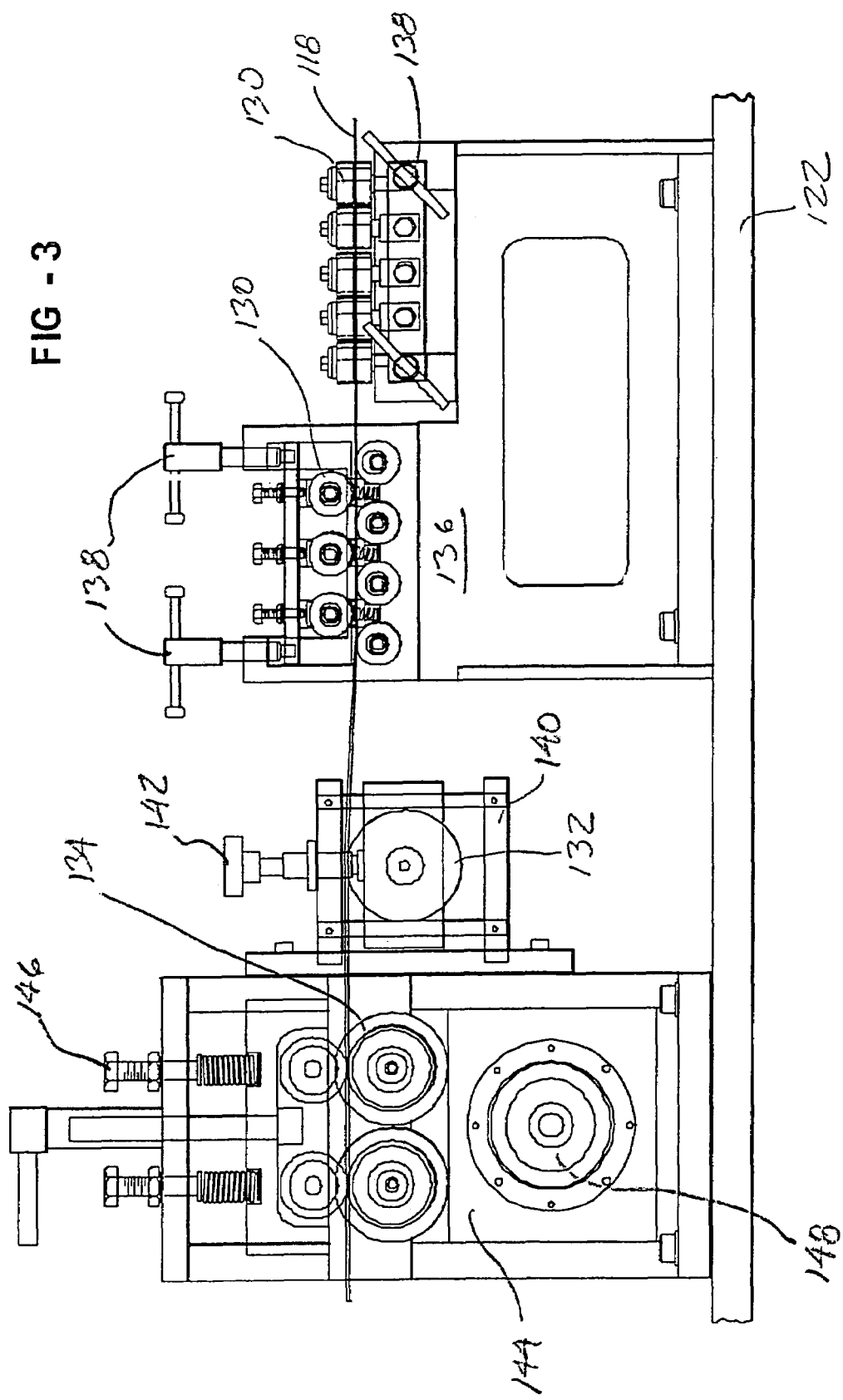
FIG. 3 is a detailed front view of the ribbon conditioning station.

The conditioning and feeding of metal ribbon 118 is shown in further detail in FIG. 3. One end of metal ribbon 118 is fed through a plurality of flattening rollers 130 which are mounted to a flattening roller support 136. Flattening rollers 130 serve to remove the curvature of the coiled metal 116 from a metal ribbon 118 which results from the storage and transport of the coiled metal 116. By passing through flattening rollers 130, the curvature is removed from metal ribbon 118, which is then presented to a metering roller 132 for obtaining precise information regarding the mount of metal ribbon 118 which has been transported through the ribbon conditioning station II. The metal ribbon 118 is transported through the ribbon conditioning station II by drive rollers 134. The flattening roller support 136 is provided with flattening roller adjusters 138 which permit a portion of the plurality of flattening rollers 130 to be adjusted in relation to the remaining portion of the flattening rollers 130. In a similar fashion, the metering roller 132 is mounted to a metering roller support 140 which is also provided with metering roller adjusters 142 to correctly position the metal ribbon 118 in relation to the metering roller 132. Drive roller support 144 provides support for drive rollers 134, as well as drive roller adjusters 146. The drive rollers 134 are operated through a gear and chain drive 148 which receives instructions from the balancing machine 10 computer. In this fashion, metal ribbon 118 may be advanced as a continuous ribbon through the flattening rollers 130, metering rollers 132 and drive rollers 144 all under computer control.

Figure 4:
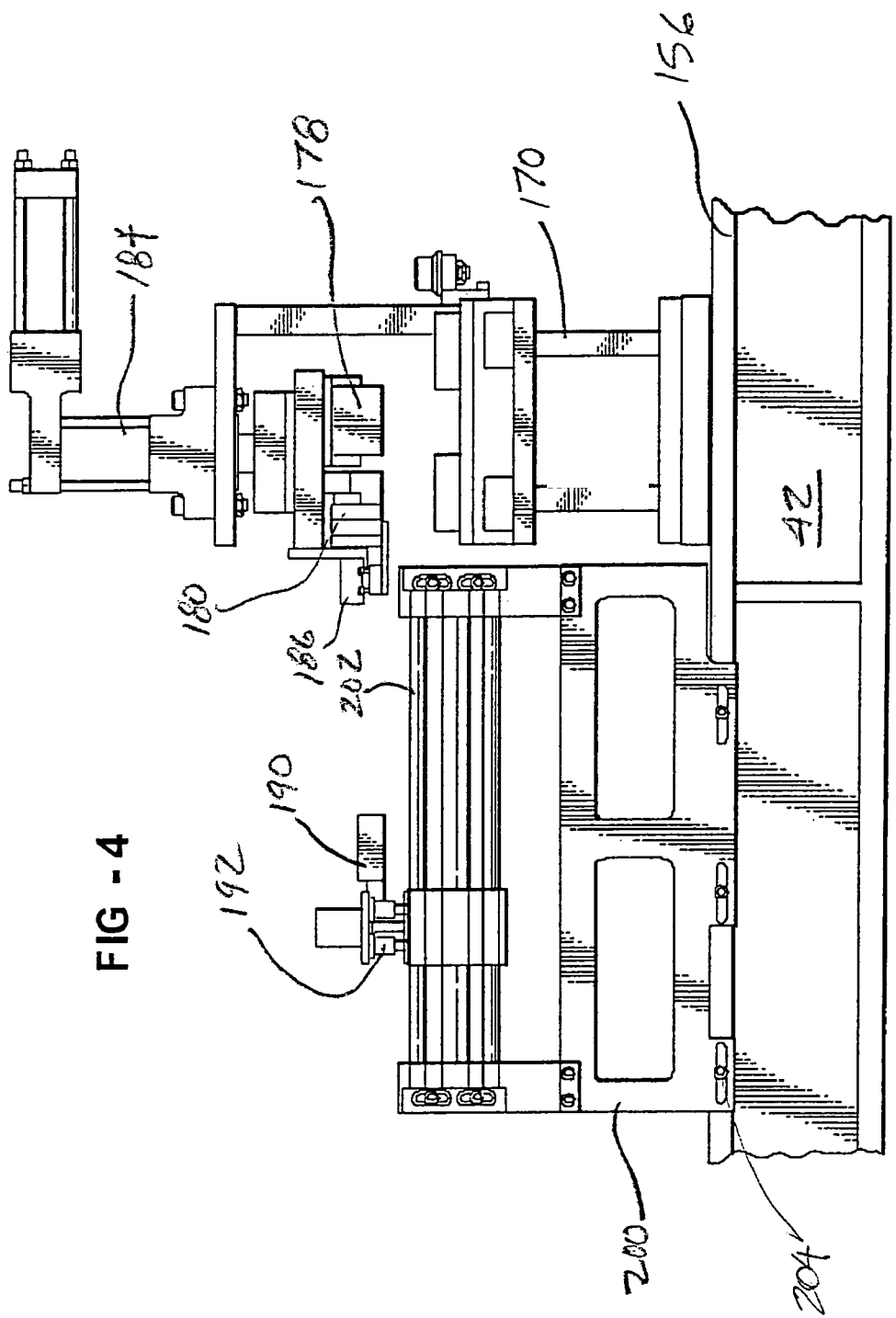
FIG. 4 is a detailed front view of the weight forming station and weight shuttle.

Immediately adjacent to the ribbon conditioning station II is the weight-forming station III, depicted in FIG. 1 and FIG. 4. Weight-forming station III and the ribbon conditioning station II are preferable mounted on a common base 156, which, in turn, may be slidably secured to the primary support rail 42. Positioning means may be provided to allow station II and station III to be longitudinally positioned along the length of the primary support rail 42. The weight-forming station III includes a weight-forming station housing (not shown) mounted to weight-forming station pedestal 170. In operation, the free end of the metal ribbon 118 is positioned by drive rollers 134 within the confines of the weight-forming station. Also located are located within weight-forming station housing are a weight-forming curvature die 178 and weight-forming dimpling dies 180. Each of the dies is operated by one or more actuators 184.

During the operation of the balancing machine 10, a drive shaft 212 is tested and the balancing machine computer, utilizing one or more sensors, determines the out-of-balance condition of the drive shaft 212 and determines the precise amount of weight which will be required to restore the drive shaft 212 to a correctly balanced condition. Information regarding the necessary size of the weight 300 is transmitted by the balancing machine computer to the drive rollers 134 in the ribbon conditioning station II and to the weight-forming station III. The appropriate length of metal ribbon 118 is advanced by drive rollers 134 through conditioning station II and through the weight forming station III. The weight-forming station actuators 184 operate the various dies within the weight-forming station III to cut, form and dimple a segment of metal ribbon 118 of the precise size necessary to bring the drive shaft 212 into correct balance. The weight 300 formed during this operation is held in place by a mechanical gripper 186 located adjacent to the discharge end of dies 178 and 180.

The weight-forming station III is adjacent to a weight shuttle 190 which extracts the formed weight 300 from the weight-forming station III. Positioned adjacent to the weight-forming station III is a movable weight shuttle 190 which is slidably mounted to a second saddle 200. Second saddle 200 is selectively positionable in relation to primary support rail 42. Second saddle 200 also is located proximate one end of the chuck 44 and a drive mechanism for spinning the chuck 44 to a desired speed for purposes of balancing the drive shaft 212, as shown in FIG. 5.

Weight shuttle 190 is slidably secured to second saddle 200 by a plurality of shuttle rails 202. The position of the second saddle 200 may be adjusted in relation to the primary support rail utilizing saddle adjuster means 204. Gripper 186 serves to position weight 300 away from the interior of the weight-forming station, and above a cavity formed in the upper surface of weight shuttle 190. Weight shuttle 190 is provided with actuators which move the weight shuttle vertically. Once the weight forming operation is complete, the weight 300 is mechanically gripped by gripper 186 and weight shuttle 190 is positioned, under computer control, to a position directly beneath gripper 186. The computer then commands weight shuttle 190 to move upward, where the upper surface of weight shuttle 190 engages gripper 186, which disengages weight 300 from gripper 186 and allows weight 300 to rest in the cavity in weight shuttle 190. In this fashion, weight shuttle 190 is permitted to transport weight 300 from the weight-forming station to a position proximate electrode 34B. Utilizing this methodology, weight 300 is transported to a position close to the weld electrode pair 34.

Weld electrode pair 34 comprises a first electrode 34A and a second electrode 34B, which together constitute the necessary paired electrodes for alternating current welding. First electrode 34A and second electrode 34B are mounted to pneumatic actuators 228, which, in turn, are mounted to pneumatic actuator carrier 224 which is selectively positionable from a position proximate weight shuttle 190 along the longitudinal length of the drive shaft 212, thereby permitting the weld electrode pair 34 to be utilized to both transport weight 300, and to position said weight 300 at any point along the length of drive shaft 212. The correct position of the weight 300 along the length of drive shaft 212 is determined by the balancing machine computer, and the carrier 224 may be selectively positioned in relation to the weight shuttle 190 and drive shaft 212 by any of a variety of well known actuators, including electric servo motors, pneumatic actuators and the like.

Once the balancing machine computer has determined the longitudinal position on the drive shaft 212 at which the weight 300 should be secured, the balancing machine computer also determines at which circumferential position on the circumference of the drive shaft 212 the weight 300 should be mounted. Under computer control, drive shaft 212 is rotated so as to present to the weld electrode pair 34 the correct circumferential position for securing the weight 300. At the same time, the balancing machine computer commands the carrier 224 to position the weld electrode pair 34 at the correct longitudinal position along drive shaft 212. Once the drive shaft 212 has been correctly rotated in relation to the weld electrodes 34, and once the weld electrodes 34 has been correctly positioned longitudinally along the longitudinal axis of the drive shaft 212, the weld electrode 34A is temporarily positioned in relation to weight shuttle 190 and the first electrode pneumatic actuator 228 is powered through pneumatic conduits 232 associated with a pneumatic manifold 106 provided with a pneumatic source to position in contact with weight 300 being transported by weight shuttle 190. A vacuum is supplied by pneumatic source through pneumatic manifold 106 and pneumatic conduits 232 to apply suction and to hold magnet 300 within a formed cavity in first electrode 34A. With the vacuum from the pneumatic source still applied, carrier 224 is repositioned above drive shaft 212 at the desired longitudinal position along the axis of drive shaft 212.

At this point in the operation as shown in FIG. 7, pneumatic actuators 228 are operated to bring first electrode 34A and second electrode 34B into contact with the outer circumference of drive shaft 212. In this fashion, the weight 300 being held in position by the vacuum applied to first electrode 34A is brought into contact with the outer circumference of drive shaft 212. Simultaneously, second electrode 34B is brought into contact with the outer circumference of drive shaft 212 and AC current is permitted to flow across the first electrode 34A and second electrode 34B of the weld head 34. The flow of electric current between the electrodes 34 results in a high temperature being created at the juncture of the feet 306 formed in weight 300, thereby fusing the feet 306 to the outer circumference of the drive shaft 212, thereby forming a permanent weld which secures the weight 300 to the outer circumference of the drive shaft 212.

In the embodiment shown in the attached figures, simultaneous welding operations may be carried out by a two weld electrode pairs 34, each of which is capable of traversing substantially the entire length of the drive shaft 212.

Once the welding operation above-described has been completed, the pneumatic actuators 228 are actuated to withdraw the first electrode 34A and second electrode 34B from proximity to the drive shaft 212, and the drive shaft 212 can again be spun at a high speed to confirm that the out-of-balance condition in the drive shaft 212 has been corrected by the installation of one or more weights 300. In the event that additional balancing is required following such testing, the above-described process can be repeated for the installation of additional weights 300 to the exterior of the drive shaft 212.

An important feature of the present invention is the utilization of the side-by-side configuration for the first electrode 34A and second electrode 34B. In balancing equipment currently used in the art, there has been a preferential use of opposed electrodes, i.e., a first electrode positionable on one side of a drive shaft, and a second electrode positionable on an opposite side of the drive shaft. Because these configurations typically use a "C" shaped mounting scheme, it is difficult, if not impossible, to easily position the weld head along the entire length of a typical drive shaft. Further, the use of the side-by-side electrode configuration permits one of the electrodes to also act as a carrier for the weight to be secured to the drive shaft.

In the present configuration, one or more electrical conductors 236 and electrodes 34A and 34B may be mounted above, below or to the front or rear of a drive shaft utilizing carriers 224 which enable positioning of the electrodes 34A and 34B while maintaining ample clearance between the drive shaft 212, the drive shaft guards, the chucks 44 and associated rotating elements of the balancing machine 10.

Once the balancing process above-described has been completed, the drive mechanism for the drive shaft 212 is de-energized, the drive shaft is released from the chucks 44, and the drive shaft 212 may be removed from the machine for further processing, and a new drive shaft inserted to repeat the process.

By providing the balancing machine 10 with movable saddles 200 which are longitudinally positionable along a primary support rail 42, the assembly is further well adapted to balancing tasks associated with drive shafts of different lengths and diameters. The process is well suited for operation under computer control and may be easily carried out in a nearly autonomous fashion; the only operator activity required is the installation and removal of the drive shaft 212 from the chucks 44 and the initiation of the balancing sequence under computer control. The invention is preferably provided with one or more chuck release control panels 400, which are provided with chuck release control switches 402 and 404, which permit a human operator to instruct the clamping and releasing of the chucks 44 for purposes of securing and releasing the drive shaft 212 from the operating station of the balancing machine 10.

We claim:

1. The method for applying a compensatory weight to a drive shaft having a longitudinal axis comprising:
   a. Securing said drive shaft in a known relationship to an imbalance sensor and a welding means, said welding means for welding having a pair of electrodes;
   b. Rotating said drive shaft in proximity to said imbalance sensor;

c. Determining an out-of-balance condition of said drive shaft;
d. Rotationally positioning said drive shaft in relation to said welding means;
e. Positioning said pair of electrodes in longitudinally-spaced positions on said drive shaft, and positioning said pair of electrodes on substantially the same radial position on the circumference of said drive shaft; and
f. Delivery of at least one compensatory weight to said welding means; and
g. Welding said weight to said drive shaft.

2. The method of claim 1, which further comprises positioning a second pair of electrodes in longitudinal-spaced positions on said drive shaft, and positioning said second pair of electrodes on substantially the same radial position on the circumference of said drive shaft, delivery of a second compensatory weight to said welding means, and welding said second compensatory weight to said drive shaft.

3. The method of claim 1, which further comprises:
a. Providing a continuous coil of metal ribbon at a position proximate said drive shaft;
b. Conveying said metal ribbon to a forming die;
c. Flattening said metal ribbon;
d. Metering the length of said metal ribbon presented to said forming die; and
e. Forming a compensatory weight from said metal ribbon by utilizing said die to sever a segment of said metal ribbon and impart to said segment a curvature.

4. An apparatus for determining an imbalanced condition of a drive shaft having a longitudinal axis, determining the location of compensatory weights to be added to said drive shaft to minimize or eliminate said imbalanced condition and for securing by welding said weights to said drive shaft comprising:
a. A fixture for securing said drive shaft in a known relationship to an imbalance sensor and a pair of welding electrodes;
b. A first drive system for securing and rotating said drive shaft in a proximity to said imbalance sensor, said sensor providing data regarding said imbalanced condition of said drive shaft;
c. A programmed computer operatively associated with said drive system and said imbalance sensor;
d. An interface for transmitting said data to said computer; and
e. A second drive system for positioning a second pair of welding electrodes in longitudinally-spaced relationship on said drive shaft, and for positioning said second pair of welding electrodes on substantially the same radial position on the circumference of said drive shaft.

5. The apparatus of claim 4 further comprising an assembly for forming a compensatory weight, said assembly comprising:
a. A spool;
b. A continuous coil of metal ribbon positioned proximate said fixture and wound on said spool;
c. At least one drive roller for withdrawing said metal ribbon from said coil;
d. At least one metering roller for measuring movement of said metal ribbon;
e. At least one flattening roller over which said metal ribbon is transported;
f. At least one die for forming an imbalance-correcting weight from said metal ribbon; and
g. A shuttle for transporting said imbalance-correcting weight from said die to said drive shaft.

6. The apparatus of claim 4, which further comprises an enclosure surrounding said apparatus, said enclosure having at least one door.

7. The apparatus of claim 5, which further comprises an enclosure surrounding said apparatus, said enclosure having at least one door.

* * * * *